Patented July 13, 1937

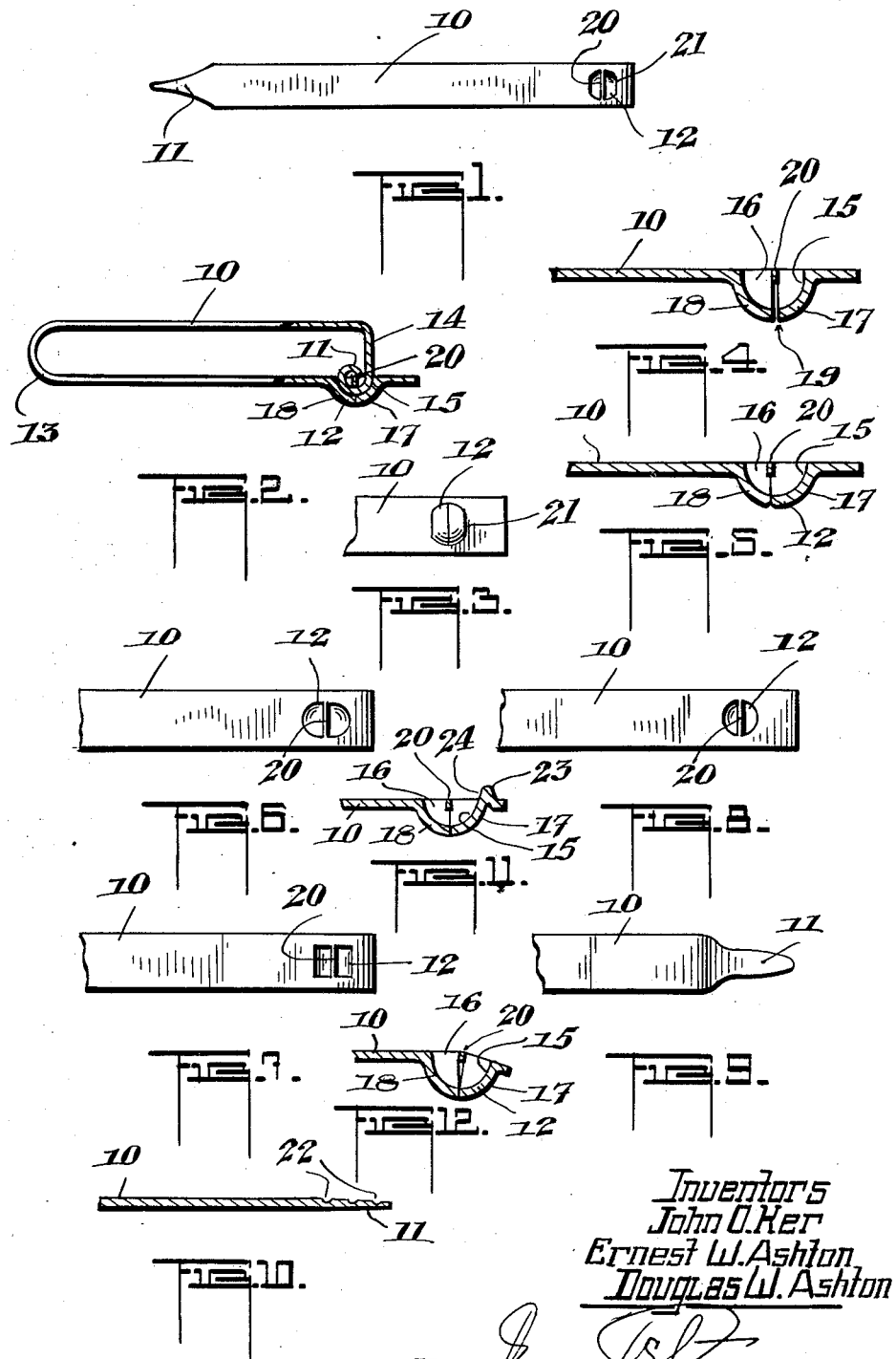

2,086,518

UNITED STATES PATENT OFFICE 2,086,518

MARKING TAG FOR ANIMALS

Ernest Ward Ashton, Douglas Willard Ashton, and John Ormond Ker, Ottawa, Ontario, Canada, assignors to Ketchum Manufacturing Company, Limited, Westboro, Ontario, Canada Application January 8, 1936, Serial No. 58,188

2 Claims. (Cl. 40—3)

This invention relates to marking tags for animals and more particularly to a tamper-proof tag.

In the marking of animals it is rather essential to provide a tag which when once applied to the animal cannot be removed without destroying the tag. The reason for this is that there have been many cases of false marking effected by interchanging the identification from one animal to another, as for instance changing the tag from a dead animal to a live one to represent the latter as other than it is. On the one hand it is possible through this procedure to effect false registration in the case of pedigreed animals and to identify a diseased animal as one which has been tested and found to be free of disease. It is a main object of the present invention, therefore, to provide a tag of simple construction which when secured to an animal cannot be removed without destroying the tag.

A further object of the invention is to provide a tag of this character which is simple to manufacture and may be marketed economically.

With these and other objects in view the invention consists essentially in a tag formed from a strip of material adapted to be bent upon itself, formed with a tapered locking tongue at one end and at the opposite end with a housing for receiving the locking tongue, the housing being formed from the strip and having an opening therein accessible from one side of the strip, the strip carrying an integral locking bar, extending across the opening, around which the locking tongue may extend when the tag has been clinched. Normally the housing is formed with curved or continuously sloped walls designed to deform the tongue when the latter engages said walls in the clinching operation so that the tongue may substantially encircle the bar, the latter being of delicate construction, and the walls of the housing being arranged so that the deformed tongue closely abuts them whereby the tongue cannot be released once clinched without breaking the integral locking bar from the strip, as described in detail in the following specification.

Referring to the drawing, Figure 1 is a bottom plan view of the tag in strip form.

Figure 2 is a side elevation partly in section of the tag bent upon itself and clinched.

Figure 3 is a top plan view of the top of the tag showing the formation of the preferred form of housing.

Figure 4 is an enlarged fragmentary section taken longitudinally through the tag to illustrate the formation of the housing and the locking bar.

Figure 5 is a view similar to Figure 4 showing the preferred form of housing and illustrating the locking bar positioned to one side of the centre transverse axis of the housing.

Figures 6, 7 and 8 are enlarged fragmentary plans of one end of the tag showing alternative shapes of housing construction.

Figure 9 illustrates a modified form of tongue for the tag.

Figure 10 is an enlarged fragmentary longitudinal section taken through the tongue end of the tag illustrating the tapering of the tongue and also illustrating the use of grooves or the like to weaken the tongue construction.

Figure 11 is an enlarged fragmentary longitudinal section through the housing end of the tag illustrating an alternative form of construction provided with a projecting lip to increase the tongue deforming surface on the housing, and Figure 12 is an enlarged fragmentary longitudinal section taken through a tag illustrating the manner in which the end of the tag housing may be bent to facilitate the unclinching of the tag without destroying the latter when using a construction of split housing.

Referring to the drawing, 10 indicates a tag made up of a strip of material preferably metal formed with a tapered locking tongue 11 at one end and an integral depressed portion or housing 12 at the opposite end, designed to receive the tongue when the tag is clinched. The tag is normally designed to be bent upon itself as at 13 and the tongue is normally designed to be bent substantially at right angles to the strip, as indicated at 14, to project above and towards the housing 12. The housing is formed to provide curved or continuously sloped walls 15, it being understood that the term "sloped" is designed to define either an inclined or curved wall, the sloping of the wall acting to deform the tongue when the tag parts are clinched together.

The housing 12 is preferably pressed from the strip being provided with an accessible opening 16 on one side of the strip and according to the invention the housing is pressed out in such a way, preferably by means of a die which will press and cut the strip to form the housing in two sections 17 and 18 spaced apart as at 19, see Figure 4, and will leave an integral locking bar 20 extending across the opening 16, the locking bar according to the present invention being very thin so that it will tend to break when the locked tag is tampered with. After the housing and locking bar have been formed on the tag, the separated sections of the housing are pressed towards each other to provide a housing which apart from the openings 16 is completely closed. Consequently when the projecting tongue at one end of the tag is moved into the housing 12 the walls of the housing will deform the tongue and when full clinching pressure is applied the tongue, which pierces the ear or other part of the animal, will be caused to curl and extend substantially around the locking bar 20, as shown in Figure 2, the walls of the housing substantially embracing the curled portions of the tongue and thus providing a firmly locked tag.

By reason of the fact that the housing is closed apart from the opening 16, the tongue will readily follow the contour of the housing during the clinching operation to extend around the locking bar without difficulty whereas it is not possible for one to endeavor to tamper with the tongue from one side of the tag as would be possible if the opening 19 were left in the housing. If the tag is tampered with and one endeavors to uncurl the tongue, the locking bar 20 will snap off; making the tag useless and preventing its application to another animal, the close engagement between the curled portion of the tongue and the inner wall of the housing making it necessary for one to use considerable force in attempting to unclinch the tongue which can only result in the breaking of the bar, as referred to.

The preferred form of housing 12 and opening 16 is that shown in Figures 1 and 3 wherein the end walls of the housing are formed straight, as indicated at 21. This provides for a very firm engagement between the tongue and the housing, wherein the straight edges of the opening 16 closely engage the straight flat surface of the tongue. It will be understood, however, that the housing may be shaped in various ways, certain of these being illustrated in Figures 6, 7 and 8. Similarly the locking bar 20 may be disposed to one side of the center transverse axis of the housing as shown in Fig. 5.

The tongue 11 is in all cases narrowed and tapered and may be of the general form shown in Figure 1 or of other convenient narrowed shape. For instance, it might be formed similar to the illustration in Figure 9. At the same time it is preferable to reduce the thickness of the tongue towards its outer free end, as for instance shown in Figure 10, where the depth of the strip in the tongue area is gradually reduced from one or both sides towards the free end of the tongue. This assists in providing for easy curling of the tongue around the locking bar during the clinching operation, facilitating this operation and at the same time aiding in the prevention of unauthorized tampering since the tongue is therefore weakened to a certain extent and would tend to break if it is unduly tampered with. The tongue may also be weakened, if desired, by providing a notch or series of notches in one face, as indicated at 22 in Figure 10.

It will be apparent, therefore, that while the tongue is relatively sharp and will pierce the ear or other part of the animal to which it is to be applied, it will readily deform when brought into contact with the sloped surface of the housing or depression during the clinching operation so that the tag is readily clinched and secured very easily.

The strip adjacent to the depression or housing 12 may be formed with a projecting lip 23, preferably stamped in the strip to increase the sloped surface of the housing for guiding the tongue thereinto so that the tongue, if not exactly registering with the housing or depression, will positively be guided thereinto.

The closed housing formed with the opening 16 on one side is the preferred form of construction as it positively provides against tampering when combined with the narrow delicate and integral locking bar and also provides a positive guide for the deforming of the tongue, obviating any obstruction to the passage of the tongue through the housing during the clinching operation.

The use of a narrow and delicate locking bar leaves but a narrow opening or space 19 between the sections 17 and 18 of the housing and this lends to drawing the sections 17 and 18 together in a practical manner to form a closed housing. It is possible, however, to employ a split housing with success, particularly when only a narrow space or opening occurs between the sections, so that the opening is not liable to catch the end of the tongue and interfere with the clinching operation. In the case of a narrow opening it is difficult to tamper with the tongue from one side of the housing but regardless of the width of the opening the fact that one exists may possibly permit tampering inasmuch as it has been found that the opening 16 to the housing may be increased in size and made more readily accessible by bending the free end of the strip so as to bring the ends of the sections of the housing together, as illustrated in Figure 12. Thus a tag formed with a depression or housing, the sections of which are spaced apart, will not produce a truly tamper-proof tag as in some cases the tag might be unclinched.

In the case where a simple form of tag is required, if it is not imperative that this be tamper-proof, it will be apparent that a tag formed with a depression or housing as illustrated, the latter being made up of two spaced apart sections and having an integral locking bar, will meet the need. In some cases, however, where the space between the housing sections is not extremely narrow, it would be necessary to employ with the clinching pliers a projection which would fit in the space between the sections in order to guide the tongue around the interior of the sections and prevent it from projecting through the space during the clinching operation, thus spoiling the tag and making it necessary to remove it and apply another.

From the foregoing it will be obvious that, while the invention is concerned with a simple tamper-proof tag, particularly one in which the defining walls of the depression or housing can be closed, the general construction, including a housing formed with separated sections, may be employed when desired.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

We claim:—

1. A tag for animals comprising a strip of material, adapted to be bent upon itself, formed with a locking tongue at one end and a housing at the opposite end for receiving said tongue, said housing being formed in two parts brought into engagement with one another to form a continuous defining wall for the housing and having an opening accessible from one side of the strip, said tongue being normally bent at right angles to the strip, positioned above and projecting towards the housing, the defining wall of the latter being sloped to deform said tongue when engaged thereby, said strip having an integral locking bar extending across the opening to the housing around which said tongue may extend when deformed during a clinching operation, and a projecting lip on said strip to one side of the housing, a portion of the surface of said lip forming a continuation of the sloped wall of the housing to provide a guide for introducing the tongue to the housing.

2. An animal marker tag comprising a strip of material adapted to be bent upon itself in substantially parallel spaced portions, one portion adjacent its free end being provided with a housing pressed outwardly from its inner face inwardly of its side edges, a locking bar integral with said strip and extending transversely thereof across the open base of the housing, said bar and the marginal edge areas of the strip at each side of the housing being in a common plane, said housing having a curved inner face spaced from said bar and being transversely slotted in parallelism therewith, the edges of the slot being contacted in abutting engagement to close the housing over said bar, and a locking tongue on the free end of the other strip portion, said tongue being directed to enter the housing towards the free end of the strip between the curved housing face and the locking bar, whereby said curved housing will deflect and deform the tongue to curl around the locking bar as the tag is clinched.

ERNEST WARD ASHTON.
DOUGLAS WILLARD ASHTON.
JOHN ORMOND KER.